United States Patent [19]

Seifert et al.

[11] Patent Number: 5,256,258
[45] Date of Patent: Oct. 26, 1993

[54] REMOVAL OF LOW-BOILING FRACTIONS FROM HIGH TEMPERATURE HEAT TRANSFER SYSTEMS

[75] Inventors: Walter F. Seifert; Gary R. Buske; John B. Cuthbert, all of Midland, Mich.

[73] Assignee: The Dow Chemical Company, Midland, Mich.

[21] Appl. No.: 800,783

[22] Filed: Nov. 27, 1991

[51] Int. Cl.$^5$ .............................................. B01D 3/34
[52] U.S. Cl. ......................................... 203/49; 203/92; 203/95; 208/356; 208/362; 208/363; 585/835; 585/860; 585/867
[58] Field of Search ........................ 203/49, 92, 96, 95, 203/98; 585/835, 860, 867; 208/236, 238, 356, 363, 358, 362; 55/52, 54, 198

[56] References Cited

U.S. PATENT DOCUMENTS

| | | | |
|---|---|---|---|
| 3,322,667 | 5/1967 | Lawson | 208/356 |
| 3,384,577 | 5/1968 | Shaffer et al. | 208/362 |
| 3,605,850 | 9/1971 | Borst, Jr. | 159/16.3 |
| 3,857,902 | 12/1974 | Inomata et al. | 260/675.5 |
| 3,920,572 | 11/1975 | King et al. | 208/48 AA |
| 4,002,525 | 1/1977 | Baleri | 159/47.3 |
| 4,199,410 | 4/1980 | Ohrui et al. | 203/49 |
| 4,230,536 | 10/1980 | Seih | 203/89 |
| 4,236,973 | 12/1980 | Robbins | 203/10 |
| 4,424,117 | 1/1984 | Kuno | 208/211 |
| 4,437,940 | 3/1984 | Sussmeyer et al. | 203/49 |
| 4,440,601 | 4/1984 | Katz et al. | 203/24 |
| 4,472,325 | 9/1984 | Robbins | 261/96 |
| 4,713,089 | 12/1987 | Robbins | 55/52 |
| 4,720,327 | 1/1988 | Aquilia et al. | 203/96 |
| 4,783,242 | 11/1988 | Robbins | 203/83 |
| 4,822,480 | 4/1989 | Harandi | 208/212 |
| 4,842,621 | 6/1989 | Robbins | 55/26 |
| 4,853,088 | 8/1989 | Conway | 203/10 |
| 4,857,084 | 8/1989 | Robbins | 55/58 |
| 4,915,792 | 4/1990 | Zeilon | 203/49 |
| 4,995,945 | 2/1991 | Craig | 202/177 |
| 5,141,630 | 8/1992 | Grosboll et al. | 208/356 |

FOREIGN PATENT DOCUMENTS

| | | | |
|---|---|---|---|
| 1420094 | 10/1968 | Fed. Rep. of Germany | 203/49 |
| 0271820 | 9/1989 | Fed. Rep. of Germany | 203/49 |
| 2276076 | 6/1974 | France | . |
| 0439296 | 11/1974 | U.S.S.R. | 203/49 |
| 912186 | 7/1980 | U.S.S.R. | . |

OTHER PUBLICATIONS

Perry et al, "Technique of Organic Chemistry", Distillation, vol. IV, 1965, pp. 3-4.

*Primary Examiner*—Virginia Manoharan
*Attorney, Agent, or Firm*—Robert M. O'Keefe

[57] ABSTRACT

Water and organic low-boiling constituents in a organic heat transfer fluids used to heat commercial processes are removed by counter current stripping the fluid with a gas such as nitrogen. The gas containing low-boiling constituents is sent to a rectification column and condenser to return heat transfer fluid which also vaporizes into the gas, but to a lesser extent than the low-boilers, to the heat transfer system.

6 Claims, 1 Drawing Sheet

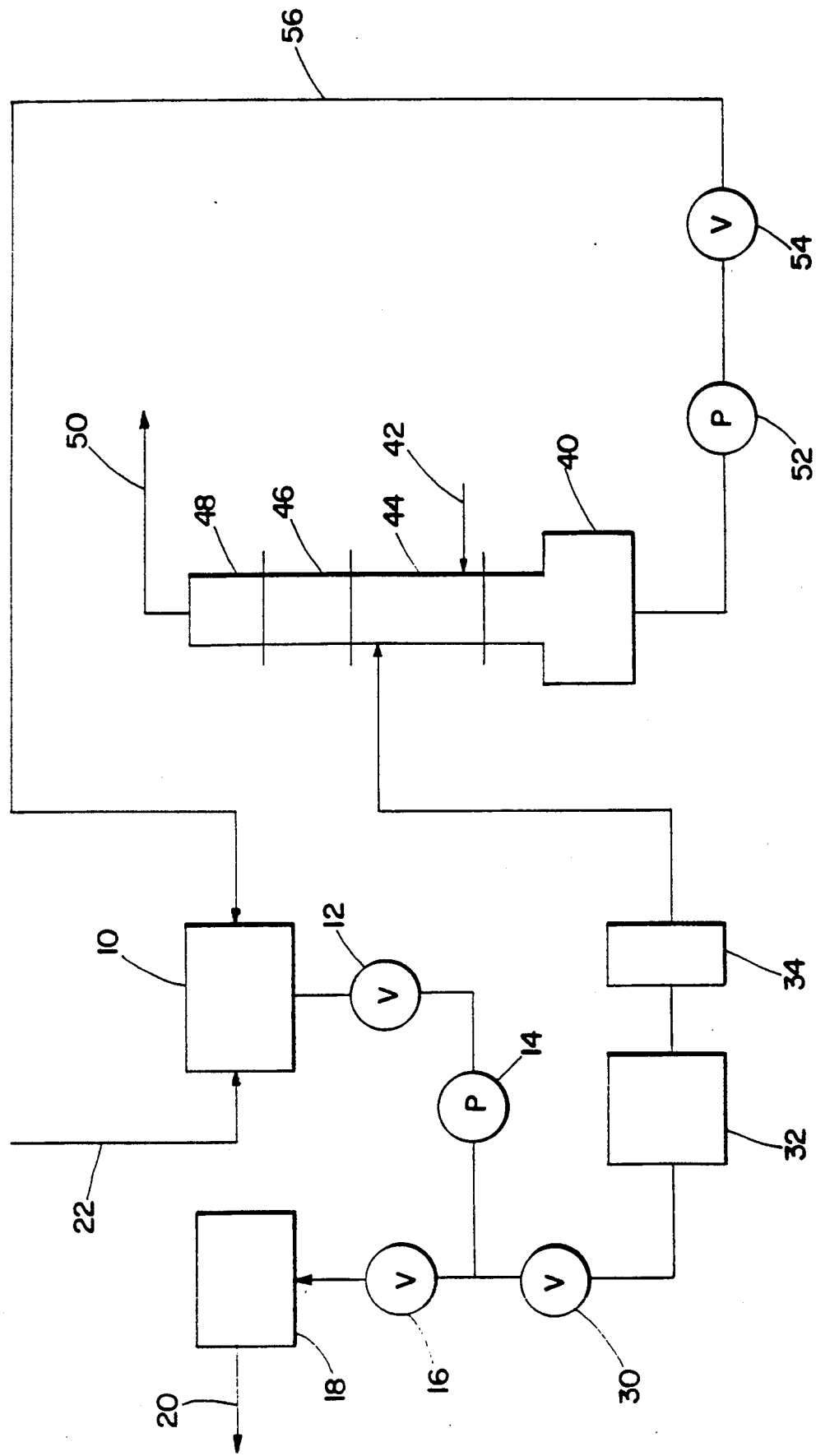

5,256,258

REMOVAL OF LOW-BOILING FRACTIONS FROM HIGH TEMPERATURE HEAT TRANSFER SYSTEMS

BACKGROUND OF INVENTION

The present invention relates generally to heat transfer systems, and more particularly to the removal of low-boiling constituents from organic heat transfer fluids.

In the operation of many industries, heat transfer systems are employed to provide a heat source for many processes which are operated in the industrial plants. Oftentimes, organic heat transfer fluids are chosen to act as the heat transfer medium. In those instances, the organic heat transfer fluids are heated to the desired temperatures, usually between 400° F. and 750° F., and then pumped through piping or the like to one or more sites where the hot organic heat transfer fluids heat one or more processes.

Since the volume of fluid in the system varies with temperature, the systems contain an expansion tank or storage tank wherein a pad of inert gas, such as nitrogen, is usually maintained in a specified range of pressure over the hot organic heat transfer fluid. If the volume of fluid decreases, inert gas is added. In the event the pressure exceeds the maximum limit, such as when the volume of fluid increases, a control valve or manual bleed allows gas to escape.

It is known that organic heat transfer fluids degrade at high temperatures to form low-boiling constituents such as paraffinic or aromatic components or mixtures thereof. The higher the temperature, the faster the fluids degrade. These low-boiling constituents enter the inert gas pad in the expansion tank and, consequently, are released to the atmosphere when the pressure control valve activates. Fresh fluid is added to replenish the fluid lost due to degradation. Since fluids initially added to the heat transfer system may degrade at elevated temperatures and these systems typically house 2,000 to 4,000 gallons of fluid, a great deal of hydrocarbons are currently being vented to the atmosphere. A solution to this problem is one object of the present invention.

Water may also be present in the fluids. Water is undesirable in heat transfer systems because the presence of water and organic acids, which are formed from the oxidation of the fluids, can lead to the corrosion of metal components of the heat transfer systems. Moreover, water raises the vapor pressure of the system, which may cause vapor lock and relief valves to open which loses product. While water can be removed by pressure venting described above, this method is highly inefficient and does not achieve sufficiently low levels of water. Nevertheless, this method is often used in the start-up of a heat transfer system despite that it may take weeks to remove the water to begin actually running the system at elevated temperatures. A solution to this problem is another object of the present invention.

The operation of heat transfer systems as described above has been practiced virtually unchanged for decades.

SUMMARY OF INVENTION

It has now been found that a solution to the problems described above can be achieved by counter current stripping the organic heat transfer fluids with a stripping gas, such as nitrogen. Thus, organic heat transfer fluid is removed from the heat transfer system and sent to a counter current stripping column wherein low-boiling constituents of the organic fluids, such as water and light hydrocarbons, as well as a lesser amount of heat transfer fluid, vaporize into the stripping gas which is passed countercurrently through the heat transfer fluid. The stripping gas containing low-boiling constituents is discharged from the counter current stripping column. The treated organic heat transfer fluid is returned to the heat transfer system. The stripping gas containing the low-boiling constituents may be fractionated with the recovered heat transfer fluid recycled back to the system and the low-boiling constituents properly disposed of. The low-boiling constituents can be disposed of by combustion as in a flare. In this way, light hydrocarbons are prevented from being released to the atmosphere.

BRIEF DESCRIPTION OF THE DRAWING

The single Figure shown in the drawing is a schematic representation of one embodiment of a system useful in practicing the present invention.

DETAILED DESCRIPTION OF THE INVENTION

The organic heat transfer fluids which can be treated in accordance with the process of the present invention comprise many types and mixtures of organic materials. Non-limiting examples of suitable organic heat transfer fluids include aromatic oils, paraffinic oils, paraffinics, aromatics, alkylated aromatics, or mixtures thereof.

Treatment of the organic heat transfer fluids by the process of the present invention serves to remove low-boiling constituents from the organic heat transfer fluids. For purposes of the present invention, "low-boiling constituent" is defined as a constituent having a boiling point lower than the organic heat transfer fluid and a vapor pressure higher than the organic heat transfer fluid to be treated. The low-boiling constituents can include water and organic compounds formed by degradation of the organic heat transfer fluids during the normal operation of heat transfer systems. Alkanes and low molecular weight aromatics are examples of such organic, low-boiling constituents which can be removed from heat transfer systems by the process of the present invention. One skilled in the art recognizes that the type and rate of degradation will vary depending on many variables, such as type of organic heat transfer fluid, temperature, and other process conditions. One skilled in the art further recognizes that organic heat transfer fluid will enter the stripping gas along with the low-boiling constituents to be removed, but will do so to a lesser extent due to its lower vapor pressure. The organic heat transfer fluid can be separated from the low-boiling constituents at a point later in the overall process, if necessary.

The stripping gas can be any gas known to those skilled in the art as useful in stripping processes. Non-limiting examples of suitable gases include methane, ethane, propane, butane, nitrogen, carbon dioxide, argon, and helium. If the primary concern is removal of light hydrocarbons, purified water as steam can be used as the stripping gas, although there will be an increase in water concentration to the system if water is used. The water can be removed in a subsequent step. Due to its low cost, relatively high purity, efficiency, and wide availability, nitrogen is the most preferred stripping gas.

The stripping gas and organic heat transfer fluid can be contacted in any suitable apparatus which insures effective contact between the stripping gas and the organic heat transfer fluid to be treated. Contact of the stripping gas and organic heat transfer fluid is preferably accomplished in countercurrent flow in a stripping column so as to assure efficient operation and adequate contact between the organic heat transfer fluid and the stripping gas. The stripping column can be packed to increase the efficiency of the column. Well known packing materials can be employed for this purpose.

The stripping gas and organic heat transfer fluid are normally maintained at about atmospheric pressure and at a temperature in the range from about 300° F. to 750° F. Less stripping gas is required as temperature increases. On the other hand, more organic heat transfer fluid moves into the stripping gas with increase in temperature.

The volume of stripping gas required to treat a given amount of organic heat transfer fluid will vary depending on several factors including temperature, pressure, and the amount of low-boiling constituent to be removed. It has been further found that the amount of stripping gas required is a function of the relative volatility of the low-boiling constituent to organic heat transfer fluid. Consequently, the larger the relative volatility of the low-boiling constituent to organic heat transfer fluid, the less stripping gas that is required to effect removal.

The process of the instant invention can be operated intermittently or continuously.

The treatment process of the present invention is useful for removing low-boiling constituents which may be present in the organic heat transfer fluid at the time of starting up a heat transfer system, or which may accumulate over time. The process can reduce the water level to less than 1,000 parts per million ("ppm"), preferably less than about 100 ppm, more preferably less than about 1 ppm. The levels of low-boiling hydrocarbons can be reduced to less than about 1,000 ppm, preferably less than about 100 ppm, more preferably less than about 0.1 ppm.

The stripping gas containing low-boiling constituents that is discharged from the counter current stripping column can be disposed of by combustion. Since some organic heat transfer fluid will inevitably be contained in the stripping gas, however, it is preferred to recover this useful fluid before disposing of the low-boiling constituents. The organic heat transfer fluid can be recovered from the stripping gas by a number of well-known techniques such as, for example, adsorption, absorption, condensation, rectification, or combinations thereof. The recovered organic heat transfer fluid can be recycled back to the heat transfer system or sent to the counter current stripping column for further treatment. After removing organic heat transfer fluid from the stipping gas, the stripping gas containing low-boiling constituents can be combusted. Alternatively, the stripping gas containing low-boiling constituents can be condensed to a liquid and disposed of in an environmentally sound way.

In another embodiment of the present invention, the side stream of organic heat transfer fluid is fed to a stripping column and a vacuum is pulled overhead. The light fraction may then be recompressed overhead and disposed of.

The detailed operation of one embodiment of the present process, wherein the stripping gas is nitrogen, is further described by referring to the drawing. In normal operation of an industrial heat transfer system, the stream of organic heat transfer fluid containing low-boiling constituents can be withdrawn from system storage tank 10 and introduced to a furnace 18 through valve 12, pump 14, and valve 16. The organic heat transfer fluid can be heated in the furnace 18 and sent out through conduit 20 to the plant where the hot fluid is used and then returned to heat transfer system 10 through conduit 22.

In the illustrated embodiment of the present invention, a stream of organic heat transfer fluid containing low-boiling constituents is withdrawn from system storage tank 10 and introduced to counter current stripping column 44 through valve 12, pump 14, valve 30, filter 32, and flow gauge and control 34.

Stripping gas, such as nitrogen, is introduced from a source into counter current stripping column 44 through conduit 42. The stream of organic heat transfer fluid descends through counter current stripping column 44, which contains packing not shown in the drawing, and is countercurrently contacted with the rising stripping gas. Low-boiling constituents and a small portion of organic heat transfer fluid vaporize into the stripping gas as the stripping gas rises through counter current stripping column 44. The stripping gas containing low-boiling constituents and a small portion of organic heat transfer fluid rises and enters packed rectification column 46 and continues to rise and enters condenser 48. In condenser 48, organic heat transfer fluid and a small amount of low-boiling constituents are condensed and fall back down to rectification column 46. In rectification column 46, therefore, rising stripping gas and falling heat transfer fluid and low-boiling constituents are contacted countercurrently. The function of the rectification column 46 and condenser 48 is to limit the amount of organic heat transfer fluid lost from the system. After passing through condenser 48, the stripping gas contains at least a portion of low-boiling constituents with the stripping gas exiting condenser 48 through conduit 50. Conduit 50 leads to a flare, not shown, wherein the low-boiling constituents are combusted.

After being contacted with stripping gas in counter current stripping column 44, the organic heat transfer fluid having had at least a portion of low-boiling constituents removed falls into storage tank 40. The organic heat transfer fluid is returned to system storage tank 10 from storage tank 40 through conduit 56 after passing through pump 52 and valve 54.

EXAMPLE

This example used the process schematically outlined in the drawing and can best be understood by reference to the FIG.

A feed stream of organic heat transfer fluid at about 500° F. containing 500 ppm water and 50 ppm benzene is withdrawn from system storage tank 10 and introduced to packed, counter current stripping column 44 through valve 12, pump 14, valve 30, filter 32, and flow gauge and control 34 at a rate of 2 gallons per minute. Nitrogen is introduced to the packed, counter current stripping column 44 through conduit 42 at a rate of 2 standard cubic feet per minute in an upward direction counter current to the downwardly flowing feed stream. Low-boiling constituents vaporize into the gaseous nitrogen as the nitrogen rises through the counter current stripping column 44.

Nitrogen containing low-boiling constituents and a small portion of organic heat transfer fluid rises and enters packed, rectification column 46 and continue to rise and enter condenser 48. In condenser 48, organic heat transfer fluid and a small amount of low-boiling constituents are condensed and fall back down to packed, rectification column 46. After passing through condenser 48, the nitrogen contains at least a portion of low-boiling constituents with the nitrogen exiting condenser 48 through conduit 50. Conduit 50 leads to a flare, not pictured in the drawing, wherein the low-boiling constituents are combusted.

After being contacted with nitrogen in counter current stripping column 44, the organic heat transfer fluid contains less than or equal to 0.5 ppm water and 0.5 ppm benzene. The stripped organic heat transfer fluid falls into storage tank 40. The organic heat transfer fluid is returned to system storage tank 10 from storage tank 40 through conduit 56 after passing through pump 52 and valve 54.

What is claimed is:

1. A process for removing low-boiling constituents from an organic heat transfer fluid, the low-boiling constituents having a boiling point below that of the organic heat transfer fluid, comprising the steps of:
   (A) removing a portion of an organic heat transfer fluid from a heat transfer system;
   (B) passing countercurrently a stripping gas, in an amount sufficient to vaporize at least a portion of the low-boiling constituents, through a moving stream of the organic heat transfer fluid;
   (C) separating the stripping gas containing low-boiling constituents from the organic heat transfer fluid;
   (D) returning the organic heat transfer fluid to the heat transfer system;
   (E) removing organic heat transfer fluid from the stripping gas containing low-boiling constituents of Step (C);
   (F) combusting the stripping gas containing low-boiling constituents from Step (E); and
   (G) returning the organic heat transfer fluid removed from the stripping gas containing obtained from Step (E) low-boiling constituents to the heat transfer system.

2. The process of claim 1 wherein the stripping gas is selected from the group consisting of methane, ethane, propane, butane, nitrogen, carbon dioxide, argon, helium, and mixtures thereof.

3. The process of claim 1 wherein the stripping gas is nitrogen.

4. The process of claim 1 wherein the stripping gas is steam.

5. The process of claim 1 wherein the organic heat transfer fluid is selected from the group consisting of aromatic oils, paraffinic oils, paraffinics, aromatics, alkylated aromatics, and mixtures thereof.

6. The process of claim 1 wherein the organic heat transfer fluid has a temperature in the range from about 300° F. to about 750° F.

* * * * *